3,103,536
HEATING CRYSTALLINE UREA TO REDUCE TENDENCY TO CAKE
Zell Smith, Jr., Edwin W. Lard, and Richard C. Horn, all of Memphis, Tenn., assignors to W. R. Grace & Co., New York, N.Y., a corporation of Connecticut
No Drawing. Filed Nov. 24, 1961, Ser. No. 154,830
5 Claims. (Cl. 260—555)

This invention relates to the treatment of crystalline urea and to the product thereby produced. More particularly this invention relates to crystalline urea having greatly reduced caking properties and to a process for preparing the same.

It is a well-known fact that many organic and inorganic salts and compounds in powdered, crystalline or granular form have a great tendency to cake and form more or less rigid solid masses when stored for any significant period of time. The ultimate consumer therefore usually must crush or otherwise break up these masses before they can be used for their intended purpose. As an example, the caking tendencies of various fertilizer materials necessitates the expenditure of much labor and time in order to render these materials suitable for even distribution in the area to be fertilized and also to avoid or substantially eliminate clogging and jamming of the distribution machinery. Crystalline urea is particularly susceptible to the difficulties mentioned.

Crystalline urea is commercially available in a variety of forms, ranging from long needlelike crystals to rectangular or square-shaped crystals of relatively large size. In the usual plant operations crystalline urea is dried to a low moisture content (less than about 0.2% by weight) and packaged in multi-ply bags having moisture barriers such as polyethylene film plies or asphalt laminate plies. Regardless of the particular shape and form of the crystals that are dried and packaged in this manner, it is always found that the mass of crystals tends to set up into a single solid cake when stored in the ordinary manner. In some instances, particularly with the needlelike crystals, a hard solid cake is formed in a matter of hours when the bagged urea is subjected to very slight pressures, on the order of 1 to 5 pounds per square inch.

Various methods have been proposed for avoiding the caking problems noted above. One prior proposal has been to completely melt the crystalline urea followed by spraying air into a small stream of the molten mass to form small uniform pellets. Other proposals involve addition of various so-called "anti-caking" agents. It has also been proposed to granulate or agglomerate crystalline urea by adding thereto a binding agent such as chalk or starch and then moistening and agitating the crystalline mass. All of these prior proposals have one or more disadvantages, for example: introduction of impurities into the urea; requirement for expensive and time consuming process steps and equipment; or production of weak and readily disintegratable pellets or agglomerates.

It is an object of this invention to provide a process for treating crystalline urea in order o reduce its tendency to cake. It is a further object of this invention to provide crystalline urea having a substantially reduced tendency to cake. It is still another object of this invention to provide a process for preparing substantially non-caking crystalline urea without the necessity of adding impurities thereto. Other objects of this invention will be apparent to those skilled in the art in view of the more detailed disclosure which follows.

It has been found that the caking tendency of crystalline urea is greatly reduced by heating the crystals at temperatures in the range of from about 200° Fahrenheit to about 270° Fahrenheit for a period of time greater than about one-half hour. The crystalline urea product of this invention can be used in any of the applications where crystalline urea is customarily used. The heat-treated product is particularly suitable for use in fertilizer applications where its substantially non-caking characteristics are of especial importance.

The crystalline urea may be heated to the treatment temperature range in any suitable manner. The pressure during heating is not critical and thus it is ordinarily preferred to heat at atmospheric pressure. Subatmospheric or superatmospheric pressures may be used if desired but do not substantially enhance the non-caking quality of the product.

Agitation during heating is not required and is therefore ordinarily dispensed with. Since the treatment temperatures used in this invention are below the melting point of crystalline urea (272° Fahrenheit) little or no agglomeration will occur even when the charge of crystalline urea is not agitated.

The treatment in accordance with the invention may be conducted in a batchwise or continuous manner. Batchwise methods simply involve placing a charge of the crystalline urea to be treated in a heated zone such as an oven or the like, and allowing the charge to remain in such heated zone for the required period of time. In the continuous process the crystalline urea is fed through a heated zone maintained at a temperature sufficient to heat the urea to temperatures in the range of from about 210° Fahrenheit to about 270° Fahrenheit. The urea may be gravity fed as for example through a rotating slightly tilted cylinder or the like; or force feed means such as a screw conveyor, helical ribbon blades, paddles or the like may be used. The feed rate in any case must be such as to provide an average residence time of greater than about one-half hour in the heated zone.

As stated, the time of heating in the process of this invention is greater than about one-half hour. Treatment times longer than about four hours can be employed if desired but generally cannot be economically justified. Higher treatment temperatures give good results in shorter periods of time. As the temperature is decreased, longer times will be required. Preferred treatment temperatures of from about 245° Fahrenheit to about 260° Fahrenheit and treatment time periods of from about one to about two hours will generally provide optimum results insofar as economy and efficiency are concerned.

The invention will be further illustrated by the following non-limitative specific examples. In each of Examples 1 to 4 the procedure for testing caking properties of the treated and untreated crystalline urea was as follows:

A 100 gram sample of crystalline urea was placed in a 1½-inch inside diameter metal cylinder and sufficient weight placed thereupon to produce a pressure of about 2 pounds per square inch. This pressure is approximately the same as that encountered under ordinary warehouse conditions, being about the same as the estimated pressure on the bottom bag in a three pallet stack. The pressurized sample was then permitted to stand at ambient temperature and humidity for a period of seven days, after which the sample was removed from the cylinder. The degree to which the sample had caked and set into a hard mass was determined by measuring the compressive weight, applied through a ⅜-inch diameter rod at the center of one end of the samples, required to break the cake or lump formed. In the other examples this test was slightly modified in the following details: a larger cylinder, 2-inches inside diameter, and a larger sample of crystalline urea, 200 grams, were used. A dead weight of 26 pounds is applied to the urea through a piston closely fitting the inside of the cylinder. As in the first test method previously described, the urea is removed from the cylinder after seven days and the weight required to break the cake formed is determined in the same manner.

EXAMPLE 1

An open container charged with 170 grams of crystalline urea was placed in a vacuum oven which had been preheated to a temperature of 250° Fahrenheit. A vacuum of about 30 inches of mercury absolute was maintained throughout the two hour heating period. The heat treated urea was then cooled to room temperature.

A 100 gram sample of the thus treated crystalline urea was tested for caking properties in accordance with the first test method described hereinabove. The weight required to break the treated sample was 0.5 kilogram. The weight required to break an untreated sample of the same crystalline urea when subjected to the same caking test was 2.7 kilograms.

EXAMPLE 2

An open container was charged with 10 grams of crystalline urea and placed in a laboratory oven preheated to a temperature of 250° Fahrenheit. No vacuum was applied. After heating for two hours at the above temperature, the container was removed from the oven and permitted to cool to room temperature. The weight required to break the thus treated urea in the first test method was 0.5 kilogram. The cake formed by an untreated sample of the same crystalline urea when tested in the same manner required 2.7 kilograms before breaking.

EXAMPLE 3

A charge of 150 grams of crystalline urea was heated in an oven preheated to a temperature of about 212° Fahrenheit for four hours and then allowed to cool to room temperature. A 100 gram sample of the urea thus treated, when tested for caking properties in the first test described above, required 0.7 kilogram to break. An untreated sample of the same crystalline urea when tested under the same conditions required 8.2 kilograms to break.

EXAMPLE 4

A ¾-inch diameter hole was cut in the bottom of a 500-milliliter round-bottom flask, and the flask then was attached in a horizontal position to a rotary vaporizer. A charge of 100 grams of dry crystalline urea was placed in the flask which was then partially immersed and rotated at 56 revolutions per minute in a bath of glycerol. The glycerol was heated to a temperature of about 265° Fahrenheit, and the rotating flask retained therein for about one hour. The measured temperature of the urea inside the flask during the one hour treatment period averaged about 255° Fahrenheit with a maximum of about 270° Fahrenheit. Comparison of the treated urea and an untreated sample of the same crystalline urea in the first caking test described above gave the following results:

Kilograms to break
Treated _____ 2.1
Untreated _____ 5.4

EXAMPLE 5

In this example a series of laboratory scale runs were made at various temperatures. The urea was heated in an electric natural convection laboratory oven. Since control response in this oven was slow it was practically impossible to heat to any exact temperature. Instead, the oven control was set to give the approximate temperature desired and actual temperatures of the urea at periodic intervals were measured and recorded. All samples were initially at room temperature and generally about one hour was needed to bring the urea crystals up to the desired temperature. The urea was heated at three temperature levels, nominally 200, 220, and 240° Fahrenheit and actually in the ranges of from about 190° to about 210°; 210° to about 230° and 230° to about 250° Fahrenheit, respectively. At the end of the heating time the samples were removed from the oven, cooled to ambient temperature (about 80° Fahrenheit) and stored in closed polyethylene containers.

The relative caking tendency of treated and untreated crystalline urea was determined by the second caking test method described hereinabove. The "caking index" data shown below represents the percentage ratio of the force required to break the cake formed from heat-treated crystals in the test to the force required to break the cake formed by an identical untreated sample of the same crystalline urea. Results of these runs are shown in Table I.

*Table I*

| Run No. | Heating Temperature (°Fahrenheit) | Cumulative Time of Heating (Hours) | Actual Temp. (°Fahrenheit) Initial | Actual Temp. (°Fahrenheit) Final | Caking Test Kilogram Req'd. to break cake | Caking Test Caking Index, percent |
|---|---|---|---|---|---|---|
| 1 | 195–210 | 0 | | | 5.2 | 100 |
|   |         | 2 | 176 | 196 | 3.2 | 61.5 |
|   |         | 3 | 196 | 198 | 3.8 | 73 |
|   |         | 4 | 198 | 203 | 2.3 | 44.3 |
| 2 | 210–230 | 0 | | | 2.9 | 100 |
|   |         | 1 | 80 | 212 | | |
|   |         | 3.5 | 212 | 226 | 005 | 17.3 |
|   |         | 5.5 | 226 | 214 | 0.7 | 24.2 |
| 3 | 210–230 | 0 | | | 4.6 | 100 |
|   |         | 1.75 | 80 | 212 | | |
|   |         | 3.25 | 212 | 225 | 4.3 | 93.5 |
|   |         | 5.75 | 225 | 221 | 1.5 | 32.6 |
| 4 | 230–250 | 0 | | | 4.6 | 100 |
|   |         | 1 | 80 | 203 | | |
|   |         | 1.25 | 203 | 217 | 0.3 | 6.5 |
|   |         | 2.4 | 217 | 243 | 1.5 | 32.6 |
|   |         | 3.9 | 243 | 248 | 0.2 | 4.4 |
| 5 | 230–250 | 0 | | | 3.9 | 100 |
|   |         | 1 | 80 | 230 | | |
|   |         | 3.25 | 230 | 248 | 1.3 | 33.3 |
| 6 | 230–250 | 0 | | | 4.5 | 100 |
|   |         | 1.75 | 80 | 248 | | |
|   |         | 3.0 | 248 | 255 | 1.2 | 26.6 |
| 7 | 230–250 | 0 | | | 6.4 | 100 |
|   |         | 1 | 80 | 199 | | |
|   |         | 2 | 199 | 241 | 2.7 | 42.2 |
|   |         | 3 | 241 | 241 | 1.6 | 25 |
|   |         | 4 | 241 | 241 | 2.8 | 43.8 |

EXAMPLE 6

This example furnishes an illustration of means and methods for performing the process of this invention on a continuous basis to produce relatively large quantities of substantially anti-caking crystalline urea.

A 12 foot section of 18 inch stainless steel pipe was welded to the rotary portion of an ordinary 3.5 cubic foot concrete mixer so that the pipe would revolve about its longitudinal axis at about 19 revolutions per minute. Eight flights, about ¾-inch high and extending for approximately the full length of the pipe, were secured to the inside of the pipe at approximately equal distances from each other (i.e., at spacing of about 45° about the inside circumference of the pipe). Ring dams were placed at each end of the pipe to maintain a bed of solids therein and the solids discharge end of the pipe was equipped with a slide gate so that the discharge rate could be controlled.

Heating of the interior of the apparatus was accomplished by tempering the combustion products from a pressurized gas burner with compressed air, and then blowing the hot gases through the rotating pipe countercurrent to the flow of crystalline urea. Temperature of the hot gases was controlled by varying the flow of natural gas to the burner and/or varying the flow of tempering air. Temperatures were measured using iron-constantan thermocouples connected through a multiple point selector switch to a direct reading temperature indicator.

The run was commenced by charging about 100 pounds of freshly bagged crystalline urea from a typical urea production unit to one end of the rotating pipe and blowing combustion gases into the other end. The urea was retained in the apparatus for about one hour, at which time the temperature of the crystals at gas inlet end was found to be between 240° and 250° Fahrenheit and the temperature of crystals at the urea feed (gas discharge) end was about 200° Fahrenheit. Fresh urea crystals were then continuously fed into the unit at a rate of 50 pounds per hour and heat-treated crystals continuously removed at the same rate, thereby providing an average residence time of about two hours. The heat-treated crystals were fed to a rotating water coled cement mixer, cooled to about 90° Fahrenheit and recovered and bagged in conventional manner. Caking tests in accordance with the second test method described above showed that the untreated crystalline urea fed to treatment unit formed a cake which required 7.3 kilograms to break, while the cake formed from the heat-treated crystalline urea product required only 0.5 kilogram.

What is claimed is:

1. Process for the treatment of pure dry crystalline urea which comprises heating said urea to a temperature in the range of from about 200° Fahrenheit to about 270° Fahrenheit for a time greater than about one-half hour and cooling said heat treated urea to ambient temperatures.

2. Process for the treatment of pure dry crystalline urea which comprises heating said urea to a temperature in the range of from about 200° Fahrenheit to about 270° Fahrenheit for a time between about one half and about 4 hours, cooling said heat treated urea to room temperature and recovering the cooled product.

3. Process for reducing the caking tendency of pure dry crystalline urea which comprises heating said urea to a temperature in the range of from about 245° Fahrenheit to about 260° Fahrenheit for a period of time of from about 1 to about 2 hours, cooling said heat treated urea to room temperature and recovering the cooled product.

4. Continuous process for reducing the caking tendency of pure dry crystalline urea which comprises providing a heat zone at a temperature sufficient to raise the temperature of crystalline urea to within the range of from about 200° Fahrenheit to about 270° Fahrenheit, continuously feeding said crystalline urea into said heated zone at such a rate that said crystals have an average residence time greater than about one-half hour in said heated zone, continuously removing the heat treated urea from the said zone, and cooling the heat treated urea to about room temperature.

5. Continuous process for reducing the caking tendency of pure dry crystalline urea which comprises providing a heated zone at a temperature sufficient to raise the temperature of crystalline urea to within the range of from about 200° Fahrenheit to about 270° Fahrenheit, continuously feeding said crystalline urea into said heated zone at such a rate that the crystals have an average residence time of from about one-half to about 4 hours in said heated zone, continuously removing the heat treated urea from the said zone, cooling the heat treated urea to about room temperature, and recovering the cooled product.

References Cited in the file of this patent

UNITED STATES PATENTS

| 2,327,333 | Kirkpatrick | Aug. 17, 1943 |
| 2,919,184 | Osswald et al. | Dec. 29, 1959 |

UNITED STATES PATENT OFFICE
CERTIFICATE OF CORRECTION

Patent No. 3,103,536            September 10, 1963

Zell Smith, Jr., et al.

It is hereby certified that error appears in the above numbered patent requiring correction and that the said Letters Patent should read as corrected below.

Column 1, line 62, for "o" read -- to --; column 3, line 28, for "10" read -- 100 --; column 4, Table I, fourth column heading, for "Actual Temp. (° Fahrenheit)" read -- Actual Temp. of Urea (° Fahrenheit) --; same table, fifth column heading, for "Kilogram" read -- Kilograms --; column 5, line 18, for "coled" read -- cooled --.

Signed and sealed this 31st day of March 1964.

(SEAL)
Attest:

ERNEST W. SWIDER
Attesting Officer

EDWARD J. BRENNER
Commissioner of Patents